United States Patent
Maruyama et al.

(10) Patent No.: US 6,463,642 B1
(45) Date of Patent: *Oct. 15, 2002

(54) METHOD OF MANUFACTURING A VIBRATION TYPE DRIVING APPARATUS

(75) Inventors: Yutaka Maruyama, Tokyo (JP); Takashi Kai, Tokyo (JP); Ichiro Chiba, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,378

(22) Filed: Sep. 28, 1998

(30) Foreign Application Priority Data

Sep. 30, 1997 (JP) .............................. 9-266107
Dec. 12, 1997 (JP) .............................. 9-362371

(51) Int. Cl.⁷ .......................... H04R 17/00; B29C 67/00
(52) U.S. Cl. ............................... 29/25.35; 310/323.08; 310/323.11; 264/320; 264/443; 264/272.16
(58) Field of Search ....................... 310/323.08, 323.11; 29/25.35, 848, 858, DIG. 29, 596; 264/320, 443, 272.15, 272.16

(56) References Cited

U.S. PATENT DOCUMENTS

| | | | | |
|---|---|---|---|---|
| 3,666,979 A | * | 5/1972 | McElroy | 29/25.35 |
| 4,923,737 A | * | 5/1990 | De La Torre | 264/320 |
| 5,066,351 A | * | 11/1991 | Knoll | 264/320 |
| 5,148,075 A | * | 9/1992 | Shirasaki | 310/323 |
| 5,150,000 A | * | 9/1992 | Imasaka et al. | 310/323 |
| 5,311,094 A | * | 5/1994 | Imasaka et al. | 310/323 |
| 5,327,040 A | * | 7/1994 | Sumihara et al. | 310/323 |
| 5,329,201 A | * | 7/1994 | Shirasaki | 310/323 |
| 5,352,950 A | * | 10/1994 | Shirasaki | 310/323 |
| 5,448,129 A | * | 9/1995 | Sumihara et al. | 310/323 |
| 5,463,265 A | * | 10/1995 | Kitani et al. | 310/323 |
| 5,508,581 A | * | 4/1996 | Saya et al. | 310/323 |
| 5,557,157 A | * | 9/1996 | Shirasaki | 310/323 |

FOREIGN PATENT DOCUMENTS

| | | | | |
|---|---|---|---|---|
| JP | 56-25410 | * | 3/1981 | 264/443 |
| JP | 5-177107 | * | 7/1993 | |

OTHER PUBLICATIONS

Boulter et al, High–Service Temperature Polyether Amide Thermoset Resins–New Materials for Electrical Insulation and High Strength Composites, Electrical Insulation Conference, Electric Manufacturing & Coil Winding Conference, Sep. 1997, pp. 249–253.*

* cited by examiner

*Primary Examiner*—Peter Vo
*Assistant Examiner*—A. Dexter Tugbang
(74) *Attorney, Agent, or Firm*—Morgan & Finnegan, L.L.P.

(57) ABSTRACT

A method of manufacturing a vibration type driving apparatus comprising an elastic member which, in use, is excited with a vibration that sets a moving member into motion relative to the vibrating elastic member. The method includes providing a friction member on at least one of the elastic member and the moving member, and pressing the friction member between a mold and the at least one of the elastic member and the moving member forming a smooth contacting surface on the friction member.

4 Claims, 9 Drawing Sheets

--PRIOR ART--

METHOD OF MANUFACTURING A VIBRATION TYPE DRIVING APPARATUS

BACKGROUND OF THE INVENTION

1. Field of the Invention

This invention relates to a vibration type driving apparatus in which a vibration member of which the vibration is excited and a contacting member contacting with the vibration member move relative to each other.

2. Related Background Art

An already proposed vibration-type driving apparatus is constructed as shown, for example, in FIG. 6 of the accompanying drawings. This vibration type driving apparatus has a ring-like vibration member 61 and a moving member (contacting member) 74.

The vibration member 61 is comprised of an elastic member 63, a group of piezoelectric elements 64 adhesively secured to the underside of the elastic member 63, and a friction member 66. adhesively secured to the upper surface (contacting surface) of the comb-tooth-like portion of the elastic member 63, and the underside of the moving member 74 is brought into pressure contact with the upper surface (sliding surface) of the friction member 66 by pressing means, not shown.

In the vibration type driving apparatus thus constructed, when a periodic signal is applied to the group of piezoelectric elements 64, a travelling wave in which elliptical motions having a plurality of time phase differences are combined together is excited in the surface particles of the vibration member 61 (the elastic member 63 and the friction member 66), and the moving member 74 is frictionally driven and rotated. Accordingly, the frictional contact state between the vibration member 61 and the moving member 74 is a factor which determines various kinds of performance such as the output torque, the number of revolutions, the energy efficiency and the life of the driving apparatus.

So, heretofore, polishing work (see Japanese Patent Application Laid-Open No. 2-211074) or grinding work (see Japanese Patent Application Laid-Open No. 1-286783) has been done to make the flatness and surface roughness of the sliding surface of the friction member 66 fall within a predetermined range. There is also a case where the portion around the sliding surface of the friction member 66 is worked into a predetermined shape by cutting work (see Japanese Patent Application Laid-Open No. 6-46580). In the polishing work and the grinding work, however, the handling of the friction member 66 is inconvenient and requires a long working time and a high cost. Also, in the polishing work and the grinding work, irregularity is liable to occur to the finished state of the sliding surface, and this is considered to directly affect the irregularity of the performance of the vibration type driving apparatus.

Also, the cutting work requires many steps and moreover, the work must be done individually for each member, and in addition, to finish the cut shape between workpieces uniformly, it is necessary to strictly effect the custody of a parameter such as a working force, and this is inconvenient and takes a long working time.

Further, the friction member 66 popular in the vibration type driving apparatus, as shown in FIG. 7 of the accompanying drawings (a cross-sectional view taken along the line 7—7 of FIG. 6), is formed of a hard additive 84 and relatively soft binder resin 85 and therefore, when it is cut by a cutting tool, cutting resistance increases in the portion of the additive and decreases in the portion of binder-resin. Therefore, the cut surface becomes an uneven surface in which the additive protrudes from the binder-resin, and a suitable smooth surface is difficult to obtain.

As regards other material of the friction member, for example, in Japanese Patent Application Laid-Open No. 5-239442 and Japanese Patent Application Laid-Open No. 4-49872, a resin material containing carbon fiber is disclosed as a material being good in abrasion property and suitable as a frictional material for a vibration wave motor from the long durability life and the stability of the coefficient of friction thereof.

However, when the evaluation of the performance of the vibration wave driving apparatus under various environments has been effected in the various uses of the vibration wave driving apparatus, it has been found that the abrasion resistance of a frictional material, i.e., the abrasion loss of the frictional material, is remarkably changed by the influence: of a change particularly in humidity. Therefore, it has been found that the life of the vibration wave driving apparatus depends greatly on the durability life of the frictional material and is greatly changed under the influence of a change in the humidity particularly in the environment of use.

A frictional material for a vibration wave driving apparatus stable against the influence of a change in humidity under an environment of low humidity or high humidity or under an environment in which there are changes in humidity is desired.

SUMMARY OF THE INVENTION

One aspect of the invention is to provide a friction member on the sliding portion of at least one of a vibration member and a contacting member which are the constituent members of a vibration wave driving apparatus, and smoothly working the sliding surface of the friction member by the pressing of a mold, thereby obtaining the sliding surface which can be worked more easily and in a shorter time than by cutting in the prior art and which is free of irregularity and assumes proper flatness and proper surface roughness.

One aspect of the invention is to provide a friction member on the sliding portion of at least one of a vibration member and a contacting member which are the constituent members of a vibration wave driving apparatus, the friction member being formed of a resin composition containing heat resisting resin and carbon fiber of the mesophase pitch origin, and stable driving can be realized even under an environment of low humidity or high humidity.

DESCRIPTION OF THE PREFERRED EMBODIMENTS

[First Embodiment]

Figure 1A:
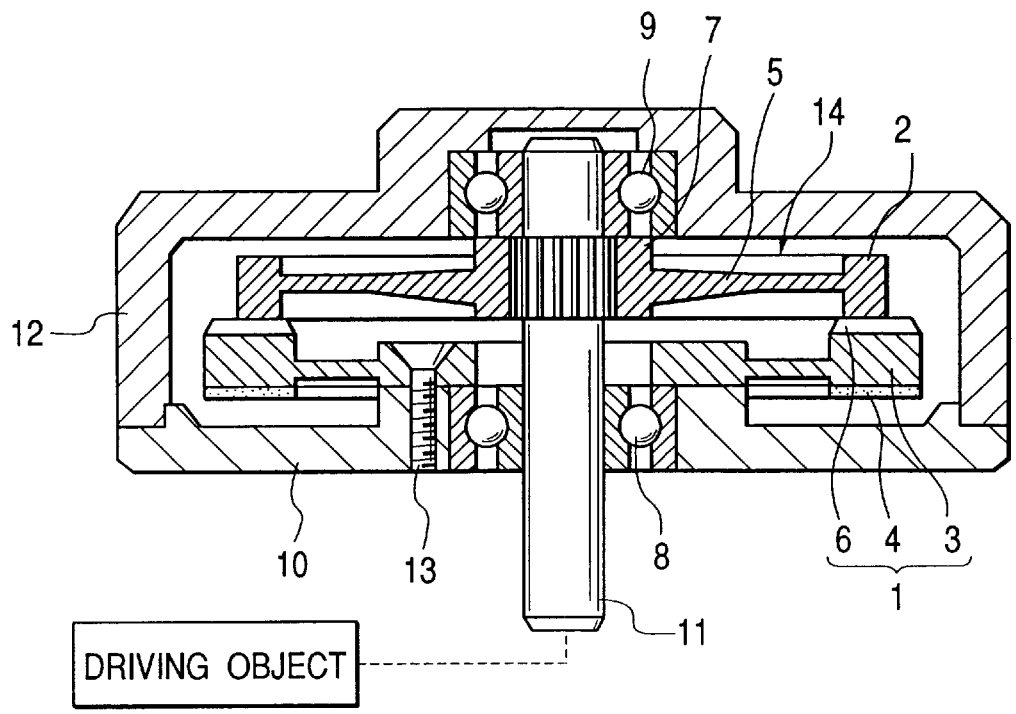
FIG. 1A is a cross-sectional view showing the construction of a vibration type motor which is a first embodiment of the present invention.

FIG. 1A shows a ring type vibration type motor (vibration type driving apparatus) which is a first embodiment of the present invention. In FIG. 1A, the reference numeral 3 designates a ring-like elastic member formed of a metal or the like. A group of piezoelectric elements 4 as electro-mechanical energy conversion elements comprising two groups of piezoelectric elements alternately polarized and disposed in a ring-like shape are concentrically adhesively secured to the underside of the elastic member 3. Also, the upper portion of the elastic member 3 is formed into a comb-tooth-like shape to enlarge vibration amplitude, and a friction member 6 is concentrically adhesively secured to the upper surface of this comb-tooth-like portion. The elastic member 3, the group of piezoelectric elements 4 and the friction member 6 together constitute a vibration member 1. Also, the inner peripheral portion of the elastic member 3 is attached to a base member 10 by a screw 13, and the entire vibration member 1. is fixed to the base member 10.

The reference numeral 14 denotes a moving member (contacting member). This moving member 14 has a ring portion 2 and a disc-like spring portion 5 having its inner peripheral boss portion 7 spline-coupled to a motor output shaft 11, and the ring portion 2 is brought into pressure contact with the vibration member 1 (friction member 6) by the pressing force of the spring portion 5. The spring portion 5 is elastically deformed by the inner peripheral boss portion 7 being pushed axially downwardly of a motor by the upper bearing 9 of the motor output shaft 11 and produces the above-mentioned pressing force.

In the thus constructed vibration type motor, when two high frequency signals differing in phase from each other are applied to the group of piezoelectric elements 4, a circumferential travelling wave is created in the elastic member 3 and the friction member 6. Therefore, the moving member 14 which is in pressure contact with the friction member 6 is rotatively driven while sliding relative to the friction member 6 by the friction thereof with this friction member 6, and this rotations is transmitted to the motor output shaft 11 through the spring portion 5 and the boss portion 7 and is taken out as a motor output, and is used as a drive force for an object to be driven in an apparatus (for example, the photosensitive drum of a copying apparatus).

The moving member 14 in the present embodiment is formed of aluminum containing 3% by weight of silicon particles having an average particle diameter of the order of 3 $\mu$m. Also, the surface of contact with the friction member 6 on the moving member 14 (ring portion 2) is worked to the range of flatness of 10 $\mu$m or less and surface roughness Rmax of 0.2 to 2 $\mu$m suitable for motor driving by polishing.

On the other hand, as the friction member 6, use is made of 80% by weight of PTFE resin and 20% by weight of carbon fiber uniformly dispersed by a mixer, and press-formed, and thereafter heat-treated at 380° C.

However, as the materials of the moving member and the friction member in the present invention, use may be made of other materials than the materials in the present embodiment, for example, a metallic material or a ceramic material as the material of the moving member, and other resin than fluororesin as the base material of the friction member 6.

Figure 1B:
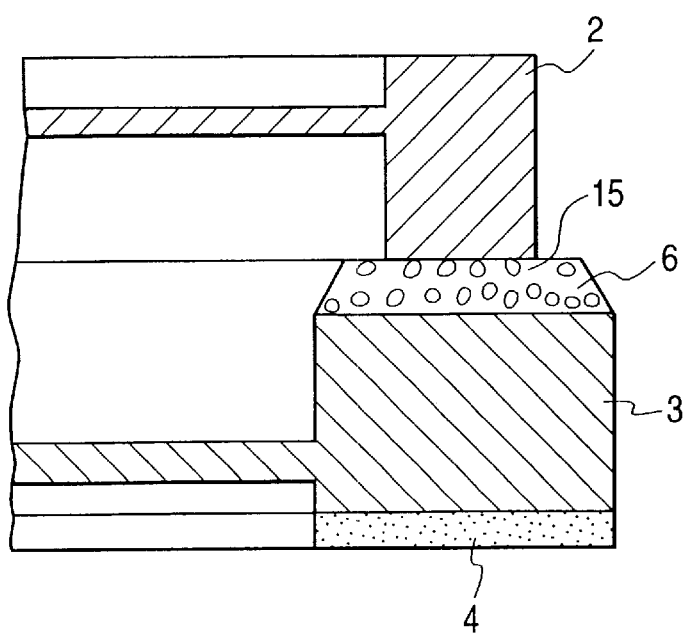
FIG. 1B is an enlarged view of the sliding portion of the motor.

FIG. 1B shows the sliding portion of the motor of the present embodiment on an enlarged scale. The friction member 6 is in pressure contact with the moving member 14 (ring portion 2) on the surface (sliding surface) of the sliding portion (contact portion) 15 thereof.

In the present embodiment, the surface of the sliding portion 15 is pressed by a method of pressing a mold. Specifically, the flat portion of a punch which is a metallic mirror surface is pressed against the entire surface of the sliding portion 15 of the friction member 6 by pressure of the order of 4×10$^7$ N/m$^2$, and is held for 60 seconds and is smoothed.

Thereby, the surface of the sliding portion 15 is worked into a smooth surface which is a surface suitable for motor driving and in which carbon fiber and PTFE resin are constructed substantially on the same surface and which is free of waviness, specifically a surface having flatness of 10 $\mu$m or less and surface roughness Rmax within a range of 5 $\mu$m or less.

Accordingly, it becomes possible to efficiently transmit minute displacement created on the surface of the sliding portion 15 by the group of piezoelectric elements 4 to the moving member 14 and moreover, it is possible to work workpieces more easily and within a shorter time than in the working by grinding or polishing and without any irregularity between the workpieces. Further, it is possible to obtain the above-described smooth surface to thereby obtain the stable output of the vibration type motor which has been impossible by the cutting work alone.

[Second Embodiment]

While the first embodiment has been described with respect to a case where a mold is simply pressed to thereby work the surface of the sliding portion 15 of the friction member 6, the surface of the sliding portion 15 may be worked by an ultrasonic working method. The construction of the vibration type motor and the shape of each constituent member in this embodiment are similar to those in the first embodiment.

Specifically, the flat portion of an ultrasonic working horn which is a metallic mirror surface member is pressed against the entire surface of the sliding portion 15 with pressure of the order of 3×10$^7$ N/m$^2$ and ultrasonic vibration is applied thereto, and the flat portion is held for 10 seconds in a state in which the temperature of the sliding portion 15 is of the order of 200 to 300° C., and is subjected to smoothing work.

Thereby, the surface of the sliding portion 15 is worked into a smooth surface which is a surface suitable for motor driving and in which carbon fiber and PTFE resin are constructed substantially on the same surface and which is free of waviness, specifically a surface having flatness of 5 $\mu$m or less and surface roughness Rmax within a range of 3 $\mu$m or less.

Accordingly, it becomes possible to more efficiently transmit minute displacement created on the surface of the sliding portion 15 by the group of piezoelectric elements 4 to the moving member 14 than in the case of the first embodiment and moreover, it is possible to work workpieces more easily and within a shorter time than in the working by grinding or polishing and without any irregularity between the workpieces. Further, it is possible to obtain the stable output of the vibration type motor which has been impossible by the cutting work alone.

[Third Embodiment]

While the first embodiment has been described with respect to a case where a mold is simply pressed to thereby work the surface of the sliding portion 15 of the friction member 6, the surface of the sliding portion 15 may be worked by a press molding method. The construction of the vibration type motor and the shape of each constituent member in this embodiment are similar to those in the first embodiment.

Specifically, the flat portion of a metal mold which is a heated mirror surface member is pressed against the entire surface of the sliding portion 15 with pressure of the order of $3\times10^7$ N/m$^2$ and is held for 20 seconds in a state in which the temperature of the sliding portion 15 is of the order of 200° C., and effects smoothing and pressing.

Thereby, as in the second embodiment, the surface of the sliding portion 15 is worked into a smooth surface having flatness of 5 μm or less and surface roughness Rmax within a range of 3 μm or less. Accordingly, it becomes possible to more efficiently transmit minute displacement created on the surface of the sliding portion by the group of piezoelectric elements 4 to the moving member 14 than in the case of the first embodiment and moreover, it is possible to work workpieces more easily and within a shorter time than in the working by grinding or polishing and without any irregularity between the workpieces. Further, it is possible to obtain the stable output of the vibration type motor which has been impossible by the cutting work alone.

[Fourth Embodiment]

Figure 2:
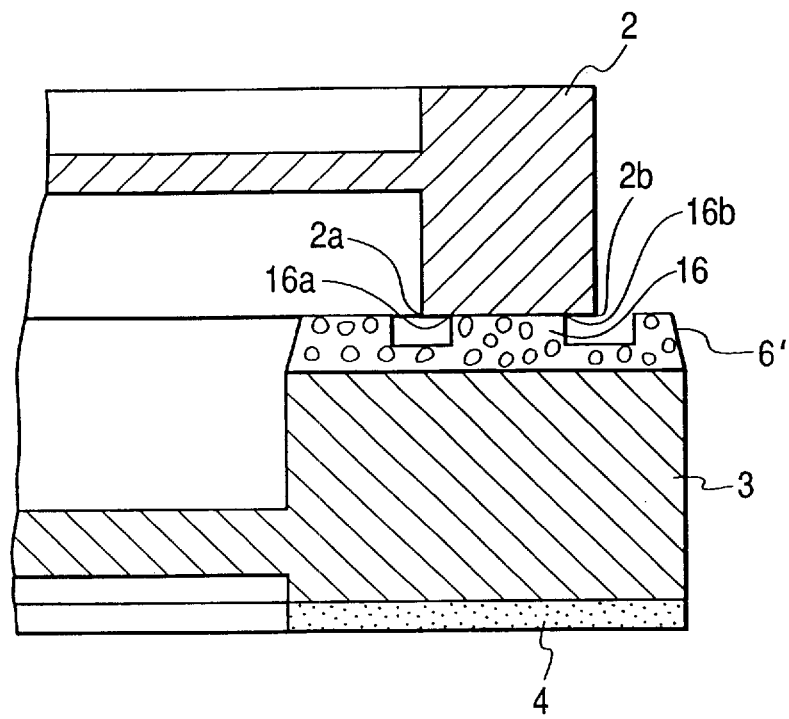
FIG. 2 is an enlarged view of the sliding portion of a vibration type motor which is a fourth embodiment of the present invention.

FIG. 2 shows the sliding portion of a vibration type motor which is a fourth embodiment of the present invention on an enlarged scale. The construction of the vibration type motor and the shape of each constituent member in this embodiment are basically similar to those in the first embodiment and therefore, common constituents are given the same reference characters as those in the first embodiment and need not be described.

In the present embodiment, the moving member 14 and a friction member 6' are made of the same materials as in the first embodiment, but the sliding portion 16 of the friction member 6' is formed into a bank type having ring-like grooves on the outer peripheral side and inner peripheral side thereof, and the surface (sliding surface) of this bank type sliding portion 16 is in pressure contact with the moving member 14 (ring portion 2).

The inner diameter side ridgeline 16a of the bank type sliding portion 16 is located more diametrally outside than the inner diameter side ridgeline 2a of the ring portion 2, and the outer diameter side ridgeline 16b of the bank type sliding portion 16 is located more diametrally inside than the outer diameter side ridgeline 2b of the ring portion 2. Therefore, the surface of the bank type sliding portion 16 is in non-contact with the ridgelines 2a and 2b of the ring portion 2.

Thereby, the hard and sharp ridgelines 2a and 2b of the ring portion 2 made of aluminum containing silicon can be prevented from bearing against the bank type sliding portion 16 at a certain angle even if the ring portion 2 is deformed by vibration. Accordingly, it is possible to prevent the concentration of stress in the bank type sliding portion 16 by the bearing against the ridgelines 2a and 2b of the ring portion 2, sudden abrasion caused thereby, and further a reduction in the starting torque and the instability of the output of the motor due to the unstable contact between the ridgelines 2a, 2b and the bank type sliding portion 16.

Figure 4A:
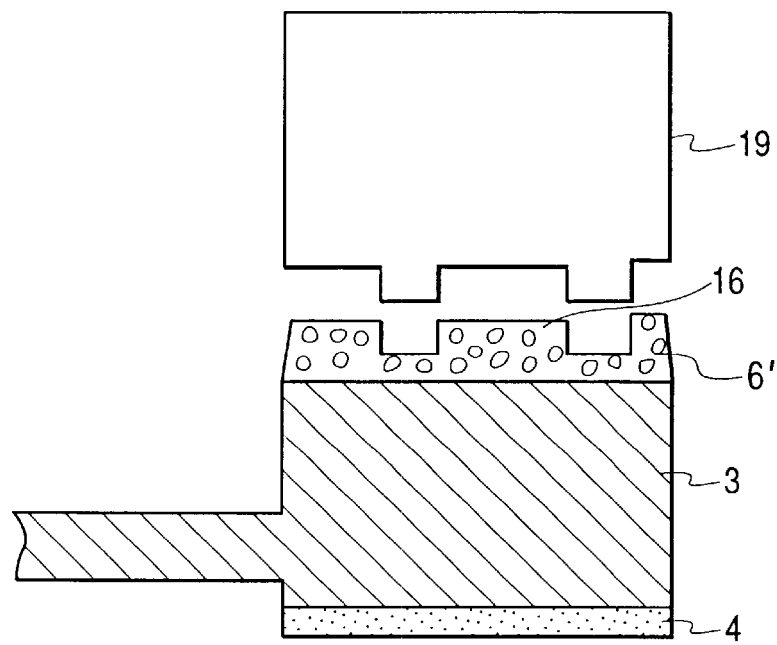
FIGS. 4A and 4B are illustrations showing a method of working the friction member of the motor of the fourth embodiment.

Also, in the present embodiment, the bank type sliding portion 16 is formed by an ultrasonic working method. Specifically, as shown in FIG. 4A, a bank type ultrasonic working horn 19 made of a metal is pressed against the upper surface of the friction member 6' with pressure of the order of $5\times10^7$ N/m$^2$ and ultrasonic vibration is applied thereto, whereby the friction member 6' is held for 10 to 30 seconds in a state in which the temperature of the friction member 6' is 200 to 300° C., thereby forming a bank type sliding portion 16 of a height of 50 to 200 μm.

Figure 4B:
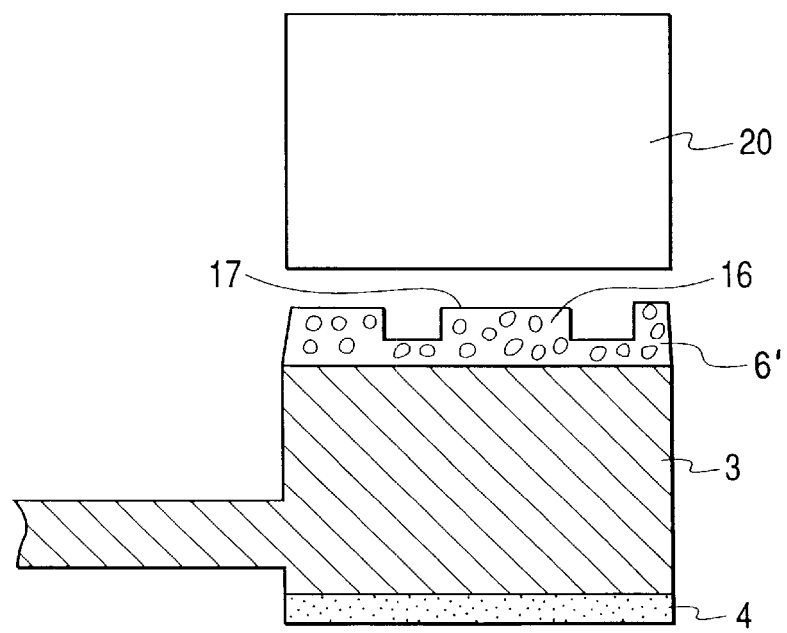

Subsequently, as shown in FIG. 4B, a flat type ultrasonic working horn 20 which is a mirror surface member made of a metal is pressed against the surface 17 of the bank type sliding portion 16 with pressure of the order of $3\times10^7$ N/m$^2$, and ultrasonic vibration is applied thereto, whereby the bank type sliding portion 16 is held for 10 seconds in a state in which the temperature of the bank type sliding portion 16 is of the order of 200 to 300° C., thereby effecting the smoothing of the surface 17.

Thereby, the surface 17 of the bank type sliding portion 16, like the surface of the sliding portion 15 described in the second embodiment, is worked into a smooth surface which is suitable for motor driving and in which carbon fiber and PTFE resin are constructed substantially on the same surface and which is free of waviness.

Accordingly, it becomes possible to efficiently transmit minute displacement created on the surface 17 of the bank type sliding portion 18 by the group of piezoelectric elements 4 to the moving member 14 and moreover, it is possible to work workpieces more easily and within a shorter time than in the working by grinding or polishing and without any irregularity between the workpieces. Further, it is possible to obtain the stable output of the vibration type motor which has been impossible by the cutting work alone.

As a method of working what provides the same shape, flatness and surface roughness as those of the bank type sliding portion 16 in the present embodiment, it is also possible to use a press molding method. Also in a method of pressing a mold, it is possible to give an appropriate condition such as heating to thereby work substantially the same shape as that of the bank type sliding portion 16.

[Fifth Embodiment]

Figure 3:
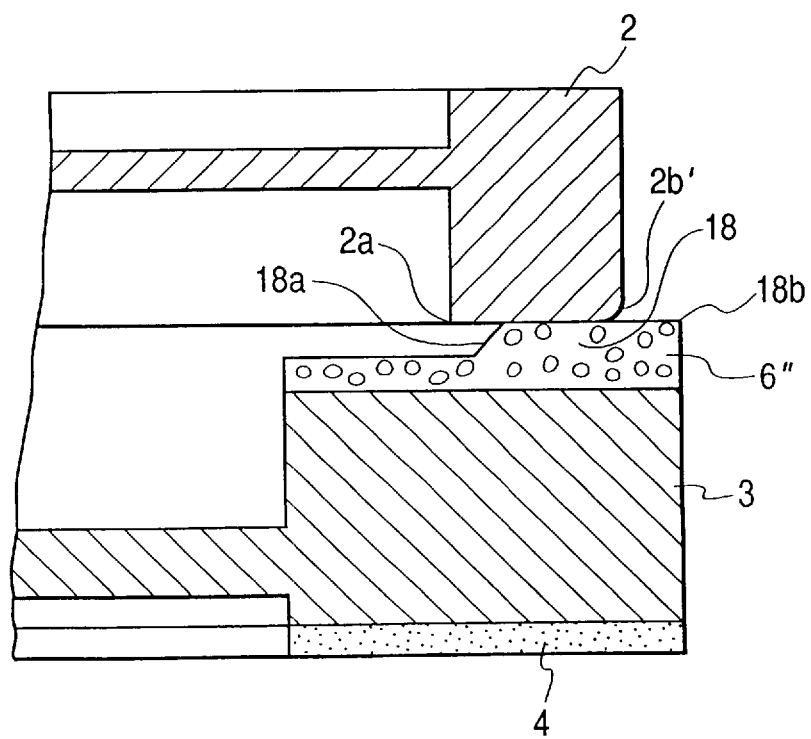
FIG. 3 is an enlarged view of the sliding portion of a vibration type motor which is a fifth embodiment of the present invention.

FIG. 3 shows the sliding portion of a vibration wave motor which is a fifth embodiment of the present invention on an enlarged scale. The construction of the vibration type motor and the shape of each constituent member in this embodiment are basically similar to those in the first embodiment and therefore, common constituents are given the same reference characters as those in the first embodiment and need not be described.

In the present embodiment, the moving member 14 and a friction member 6" are made of the same materials as those in the first embodiment, but the sliding portion 18 of the friction member 6" is formed into a bank type having a ring-shaped cut-away on the inner peripheral side thereof, and the surface (sliding surface) of this bank type sliding portion 18 is in pressure contact with the moving member 14 (ring portion 2).

The inner diameter ridgeline 18a on the surface of the bank type sliding portion 18 is located more diametral outside than the inner diameter side ridgeline 2a of the ring portion 2, and the outer diameter ridgeline 18b of the bank type sliding portion 18 is also located more diametral outside than the outer diameter ridgeline 2b' of the ring portion 2. That is, the outer diameter ridgeline 2b' of the ring portion 2 is on the bank type sliding portion 18 of the friction member 6".

However, the outer diameter ridgeline 2b' of the ring portion 2 is formed into a rounded shape and therefore does not directly contact with the bank type sliding portion 18. Thus, the upper surface of the bank type sliding portion 18 is in non-contact with the ridgelines 2a and 2b' of the ring portion 2.

Thereby, the hard and sharp ridgelines 2a and 2b' of the ring portion 2 made of aluminum containing silicon can be prevented from bearing against the bank type sliding portion 18 at a certain angle even if the ring portion 2 is deformed by vibration. Accordingly, it is possible to prevent the concentration of stress in the bank type sliding portion 18 by the bearing against the ridgelines 2a and 2b' of the ring portion 2 and sudden abrasion caused thereby and further, a reduction in the starting torque and the instability of the output of the motor due to the unstable contact between the ridgelines 2a, 2b' and the bank type sliding portion 18.

Figure 5A:
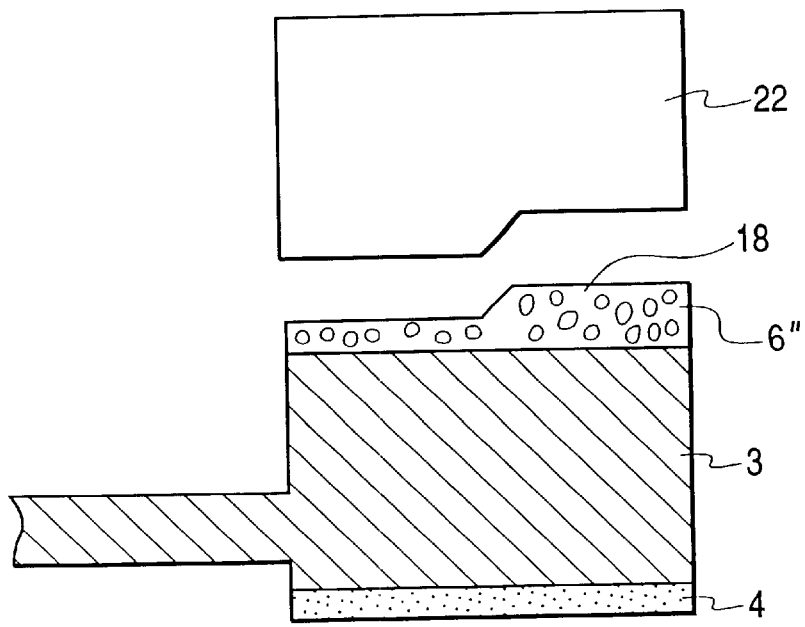
FIGS. 5A and 5B are illustrations showing a method of working the friction member of the motor of the fifth embodiment.
Figure 5B:
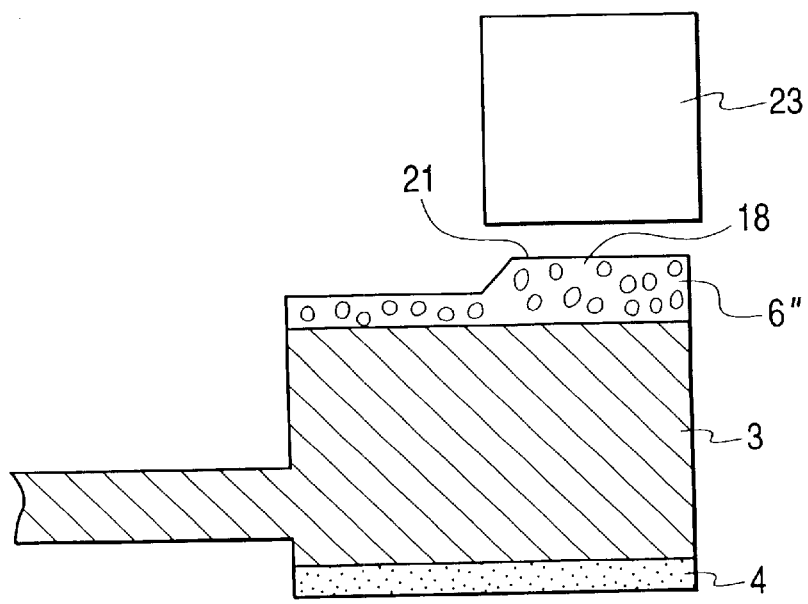
Figure 6:
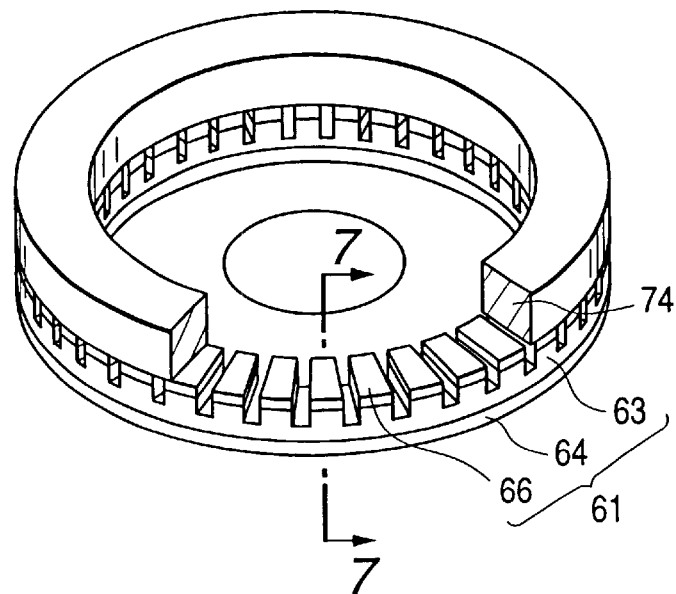
FIG. 6 is a perspective view of a vibration type motor according to the prior art.
Figure 7:
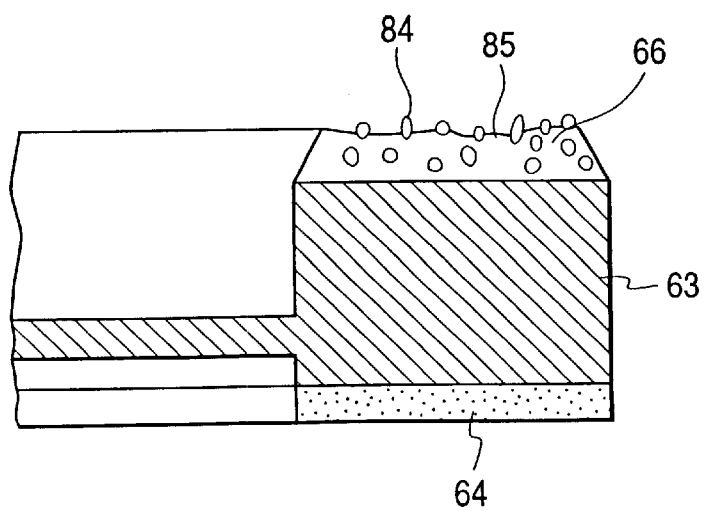
FIG. 7 is an enlarged view of the sliding portion of the vibration type motor according to the prior art.

Also, in the present embodiment, the bank type sliding portion 18 is formed by an ultrasonic working method. Specifically, as shown in FIG. 5A, a bank type ultrasonic working horn 22 made of a metal is first pressed against the surface of the friction member 6" with pressure of the order of $5 \times 10^7$ N/m$^2$ and ultrasonic vibration is applied thereto, whereby the friction member 6" is held for 10 to 30 seconds in a state in which the temperature of the friction member 6" is 200 to 300° C., thereby forming a bank type sliding portion 18 of a height of 50 to 200 μm. Subsequently, as shown in FIG. 5B, a flat type ultrasonic working horn 23 which is a mirror surface member made of a metal is pressed against the surface 21 of the bank type sliding portion 18 with pressure of the order of $3 \times 10^7$ N/m$^2$, and ultrasonic vibration is applied thereto, whereby the bank type sliding portion 18 is held for 10 seconds in a state in which the temperature of the bank type sliding portion 18 is 200 to 300° C., thereby effecting the smoothing of the surface 21.

Thereby, the surface 21 of the bank type sliding portion 18, like the sliding portion 15 described in the second embodiment, is worked into a smooth surface which is suitable for motor driving, and in which carbon fiber and PTFE resin are constructed substantially on the same surface and which is free of waviness.

Accordingly, it becomes possible to efficiently transmit minute displacement created on the surface 21 of the bank type sliding portion 18 by the group of piezoelectric elements 4 to the moving member 14 and moreover, it is possible to work workpieces more easily and within a shorter time than in the working by grinding or polishing and without any irregularity between the workpieces. Further, it is possible to obtain the stable output of the vibration type motor which has been impossible by the cutting work alone.

As a method of working what provides the same shape, flatness and surface roughness as those of the bank type sliding portion 18 in the present embodiment, it is possible to use a press molding method. Also, in a method of pressing a mold, it is possible to give an appropriate condition such as heating to thereby work substantially the same shape as that of the bank type sliding portion 18.

Also, each of the above embodiments has been described with respect to a case where the vibration member is provided with a friction member, but the present invention can also be applied to a vibration type driving apparatus in which the moving member (contacting member) is provided with a friction member or both of the vibration member and the moving member are provided with friction members.

Further, the present invention can also be applied to a vibration type driving apparatus having a friction member having other sliding portion shape than the shapes in the above-described embodiments.

Also, the present invention can be applied to other vibration type driving apparatus (for example, of a linear type) than the ring-like vibration type motor described in each of the above embodiments.

As described above, in the above-described embodiments, design is made such that the sliding surface of the friction member is worked by pressing a mold and therefore, it is possible to obtain a sliding surface having all of suitable flatness, surface roughness and shape more easily and within a shorter time than in the case of the prior-art: working method of effecting the cutting work or the polishing work, and further without any irregularity between workpieces.

If the friction member is heated and thermoplastically deformed when the mold is pressed, a sliding surface free of irregularity can be obtained more easily and within a shorter time than when the mold is simply pressed.

Also, if the sliding surface of the friction member is worked by a press molding method or an ultrasonic working method, a sliding surface free of irregularity can be obtained more easily and within a shorter time than when the mold is simply pressed in a high atmosphere.

Further, if the sliding surface of the friction member is formed into a shape which is in non-contact with at least one ridgeline portion on the sliding portion of a partner member to be contacted (for example, a contacting member made of aluminum or the like), the friction member can be prevented from being shaved by the hard and sharp ridgeline portion of the partner member, or a reduction in the starting torque and the instability of the output of the driving apparatus by unstable contact can be prevented.

Other example of the friction member will now be described.

Another friction member for the vibration wave motor is characterized by the use of a material comprising a resin composition containing heat-resisting resin and mesophased pitch carbon fiber.

That is, this friction member is characterized in that the kind of the carbon fiber contained in the material thereof is a resin material limited to mesophased pitch carbon fiber, whereby the change in the abrasion loss of the friction member relative to a temperature change is made as small as possible.

As the heat-resisting resin contained in the resin composition used for the friction member, mention may be made of one or more kinds of resin chosen from among fluororesin, polyimide resin, alkyd resin, polyester resin, acryl resin, amino resin, polyamide resin, epoxy resin, phenol resin, urea resin, polyurethane resin, polyamide imide resin, polyether imide resin and silicone resin. Of these resins, fluororesin and polyimide resin are preferable, and fluororesin is particularly preferable. These resins have high durability, heat resistance and hydrophobic property and therefore provide a friction characteristic suitable for a vibration wave motor (vibration type driving apparatus). Also, other additive, for example, organic, inorganic or like fiber can be added to heat-resisting resin to thereby achieve an improvement in durability. Besides, another effect can be expected in reducing and adding a solid lubricant.

As the mesophased pitch carbon fiber contained in the resin composition used for the friction member of the present invention, use is made of mesophased pitch carbon fiber in pitch carbon fiber.

That is, generally carbon fiber has its property greatly influenced by the starting raw material and is often distinguished by the name of the raw material.

At present, commercially available on the industrial scale are two kinds, i.e., PAN carbon fiber using acryl fiber (polyacrylonitrile, hereinafter referred to as "PAN") as the starting raw material., and pitch carbon fiber made from a pitch obtained by, polymerizing tar obtained during the dry distillation of coal or the residual oil of the distillation or heat decomposition of crude oil by heat treatment, and PAN carbon fiber overwhelmingly occupies the share, but pitch carbon fiber is commercially most available as inexpensive and universal carbon fiber. It is further classified into what was subjected to graphitic treatment and became graphitic fiber, and carbonic fiber which is not subjected to graphitic treatment.

Pitch carbon fiber is further divided into two, and carbon fiber made from mesophased pitch producing liquid crystal phase (mesophase) optically exhibiting anisotropy when pitch is heated and changes from the liquid phase to the solid phase is called mesophased pitch carbon fiber, and what does not produce mesophase and is made from optically isotropic pitch is called isotropic pitch carbon fiber, and these two are distinguished from each other. This difference between anisotropy and isotropy is remarkable in the orientation of the minute texture (crystal) of the carbon material and the degree thereof, and greatly changes the property of carbon fiber. Above all, the mesophased pitch is noted as a characteristic of the material because the minute texture of carbon fiber has remarkable orientation in the axial direction or the cross-sectional direction thereof and as the result, it is possible to make the mechanical properties thereof, e.g., tensile modulus of elasticity, compressive strength, etc. great.

However, it is very difficult to foresee the phenomenon of general frictional abrasion as well as the phenomenon of special frictional abrasion in the vibration wave motor from these mechanical properties of carbon fiber, and by actually making various kinds of materials and evaluating them by the use of a vibration wave motor, and examining the difference therebetween, it has been found that when the environment of use such as the humidity condition of the vibration wave motor changes, mesophased pitch carbon fiber is suitable as a material difficult to be affected by humidity.

As specific examples of mesophased pitch carbon fiber used in the present invention, trade name MC-249, produced by Osaka Gas Co., Ltd., is mentioned for carbonic fiber, and trade name MG II-249, produced by Osaka Gas Co., Ltd., is mentioned for graphitic fiber subjected to graphitic treatment. The content of mesophased pitch carbon fiber in the aforementioned resin composition in the present invention is usually 2 to 50% by weight, preferably 5 to 40% by weight, and more preferably 10 to 30% by weight. For less than 2% by weight, the friction member is liable to be affected by humidity, and when 50% by weight is exceeded, the strength of the resin composition drops and this is not preferable.

Besides the above-mentioned components, other additives can be further added to the aforementioned resin composition in the present invention. As the additives, mention may be made, for example, of solid lubricants such as molybdenum trisulfide, carbon powder and PTFE powder, high molecular materials such as polyimide powder and other highly heat-resisting material powder, and alumina, silicon carbide and other inorganic material powder. If these additives are added, durability, the stability of frictional abrasion and other various characteristics can be improved and this is preferable.

The vibration wave motor of the present embodiment is a vibration wave motor having a vibration member forming vibration, and a contacting member frictionally contacting with this vibration member and moved relative to the vibration member by the vibration, characterized in that a friction member formed of a resin composition containing the above-mentioned heat-resisting resin and mesophased pitch carbon fiber is provided on the frictional contacting portion of at least one of the vibration member and the contacting member.

Figure 8:
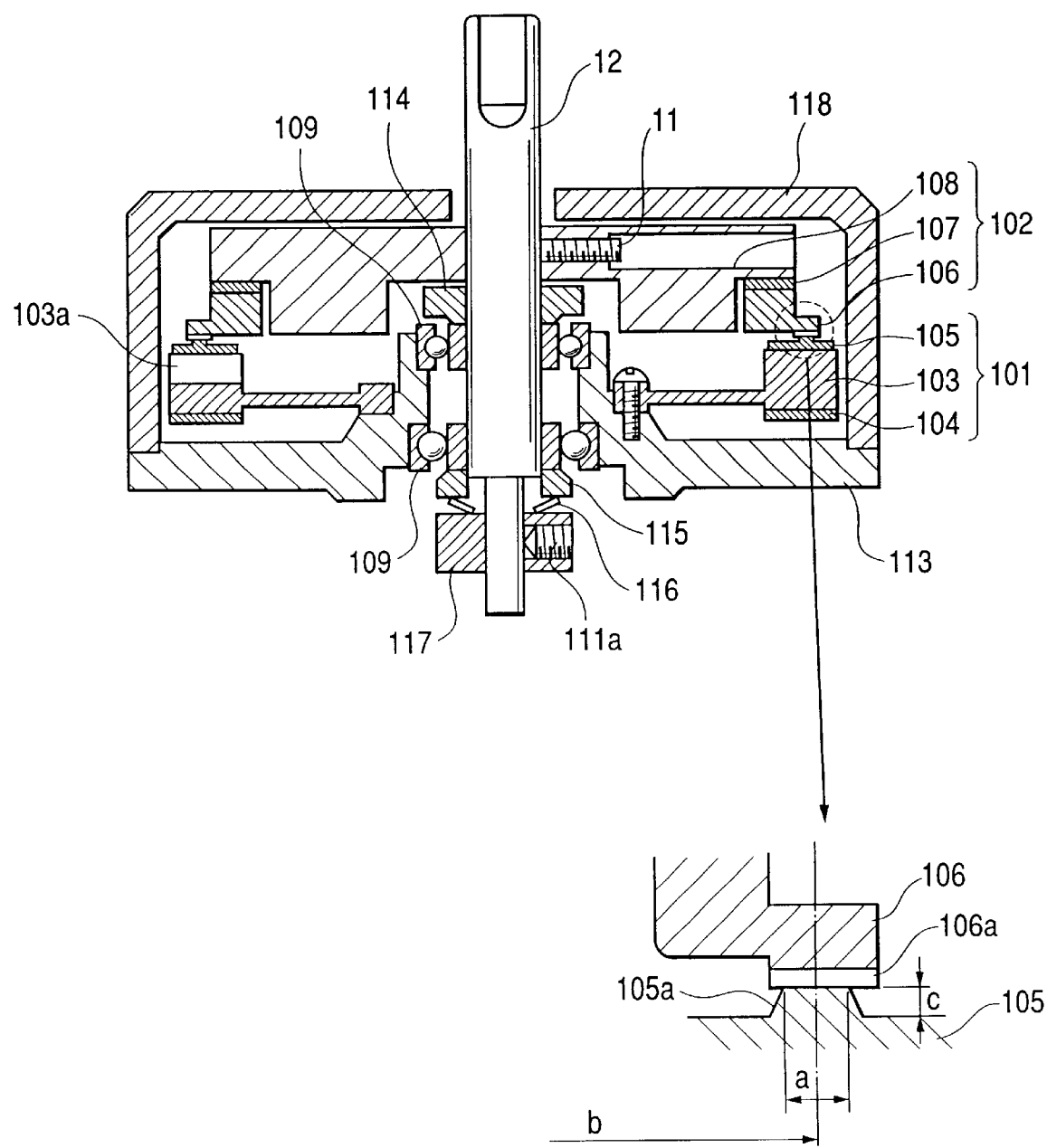
FIG. 8 is a cross-sectional view showing another embodiment of the vibration wave motor of the present invention.

FIG. 8 is a cross-sectional view showing an embodiment of the vibration wave motor of the present invention. In FIG. 8, the reference numeral 101 designates a vibration member comprising piezoelectric elements 104 as two groups of ring-like electro-mechanical energy conversion elements polarized into a plural portion and secured to one end surface of a ring-like metallic elastic member 103 formed of stainless steel by a heat-resisting epoxy resin adhesive agent, and a friction member 105 likewise secured to the other end surface of the metallic elastic member 103.

On the other hand, a friction member 106a is provided on the frictional sliding surface of a ring-like contacting member 106 formed of an aluminum alloy on a moving member 102 side. The contacting member 106 is mounted on a support member 108 through a rubber ring 107, and the support member 108 is fixed to an output shaft 112 by a screw 111. The friction member 105 of the vibration member 101 and the friction member 106a of the contacting member 106 are in contact with each other to thereby form a frictional sliding surface, and are axially pressed by a pressing leaf spring 116 with a load of 5 kgf in total. The reference numeral 109 denotes a bearing, the reference numeral 113 designates a disk plate for fixing the vibration member 101, reference numeral 118 designates a cover, the reference numerals 114 and 115 denote pressure-giving collars, and the reference numeral 117 designates a collar fixed to the output shaft 112 by a screw 111a.

Showing an example of the shape of the friction member 105, a circumferential level difference 105a is provided on the friction member 105, and the height C thereof is 0.15 mm. Also, the width a of the portion of contact (sliding surface) between the friction members 105 and 106a of FIG. 8 is 0.8 mm, and the diameter b of the portion of contact (sliding surface) is 30 mm.

When an AC voltage of a frequency inherent to the vibration member 101 is applied to the two groups of piezoelectric elements 104 alternately polarized in the direction of thickness thereof, the vibration member 101 causes resonance and a travelling vibration wave is created in the circumferential direction thereof, and a frictional force acts on the friction member 106a through the friction member 105, and the moving member 102 is rotatively driven.

The friction member may be used as both or one of the friction members 105 and 106a. When the friction member of the present invention is used as one of them, an ordinary friction member can be used as the other.

As the ordinary friction member, mention may be made of an aluminum-silicon alloy, hardened steel, ceramics, a super hard alloy or the like which is hard and has toughness and is almost free from abrasion.

As described above, in the construction of the present invention, a friction member formed of a resin composition containing heat-resisting resin and mesophased pitch carbon fiber is used as the frictionally contacting friction member of at least one of the contacting member and the vibration member of the vibration wave motor and therefore, the vibration wave motor can be driven stably against the influence of any change in humidity under an environment of low humidity or high humidity and an environment having changes in humidity, and the stabilization of the life of the vibration wave motor also becomes possible, and the reliability of the vibration wave motor can be more enhanced.

Also, the present invention can be used in various kinds of apparatuses with a vibration wave motor provided with the above-described friction member as a drive source, and as specific examples of the apparatuses, mention may be made of optical apparatuses such as cameras, business machines such as printers and copying apparatuses, and automobile-related apparatuses such as power windows and active suspensions.

[Sixth Embodiment]

The friction member was made in the following manner.

Carbon fiber (short fiber) shown in Table 1 and 20% by weight of carbon fiber (short fiber) subjected to graphitic treatment were uniformly dispersed in and mixed with 80% by weight of polytetrafluoroethylene (hereinafter referred to as PTFE) resin powder, whereafter they were pressed with pressure of 500 kg/cm$^2$ to thereby make a molded body having a diameter of 8 cm, an inner diameter of 1 cm and a height of 10 cm, and it was baked at a temperature of 360° C. for 3 hours to thereby obtain a cylindrical baked member. The cylindrical baked member was cut by a cutting apparatus to thereby make a cylindrical sheet having a thickness of 0.5 mm. The sheet was punched and was used as the ring-like friction member 105 of FIG. 8.

The dimensions of the short fiber used were a diameter of about 10 μm to 13 μm and a length of about 100 μm to 130 μm.

TABLE 1

| Sample No. | kind of carbon fiber |
|---|---|
| 1 | mesophased pitch (carbonic) |
| 2 | mesophased pitch + graphitic treatment (graphitic) |
| 3* | isotropic pitch (carbonic) |
| 4* | isotropic pitch + graphitic treatment (graphitic) |
| 5* | polyacrylonitrile (carbonic) |

(Note 1) In Table 1, Nos. 1 and 2 show embodiments and Nos. 3, 4 and 5 (mark *) show comparative examples.

(Note 2) In Table 1, the mesophased pitch carbon fiber of sample No. 1 is trade name MC-249 produced by Osaka Gas Co., Ltd.

The mesophased pitch+graphitic treatment of sample No. 2 is trade name MG II-249 produced by Osaka Gas Co., Ltd.

The isotropic pitch carbon fiber of sample No. 3 is trade name SG-249 produced by Osaka Gas Co., Ltd.

The isotropic pitch+graphitic treatment of sample No. 4 is trade name LXX-941 produced by Osaka Gas Co., Ltd.

The polyacrylonitrile carbon fiber of sample No. 5 is trade name Toreka MLD-300 produced by Toray Industries, Inc.

In Table 1, Nos. 1, 3 and 5 are fiber which was carbonized and became carbonic after each raw material was in solubilized or stabilizing-treated (treated at 800 to 1200° C. in inactivated ambient gas) after fiber forming, and Nos. 2 and 4 are fiber which was further subjected to graphitic treatment at 2000 to 3000° C. in inactivated ambient gas and became carbonic.

The shape of the friction member 105, as shown in FIG. 8, is such that the friction member 105 is provided with a circumferential level difference 105a, the height of which is 0.15 mm. Also, the width a of the portion of contact (sliding surface) between the friction members 105 and 106a is 0.8 mm and the diameter b of the portion of contact (sliding surface) is 30 mm.

The friction member 105 was fixed to a metallic elastic member 103 formed of stainless steel by an adhesive agent (of the epoxy thermosetting type), and as the friction member 106a of the contacting member 106 formed of aluminum, use was made of one formed of tungsten carbide containing cobalt by thermal spraying to make the vibration wave motor shown in FIG. 8.

The evaluation of the friction member described below is obtained as a value obtained by the vibration wave motor being driven at 300 rpm in rotating speed and torque of 300 g-cm for 100 hours on end. The result is shown in FIG. 9.

Figure 9:
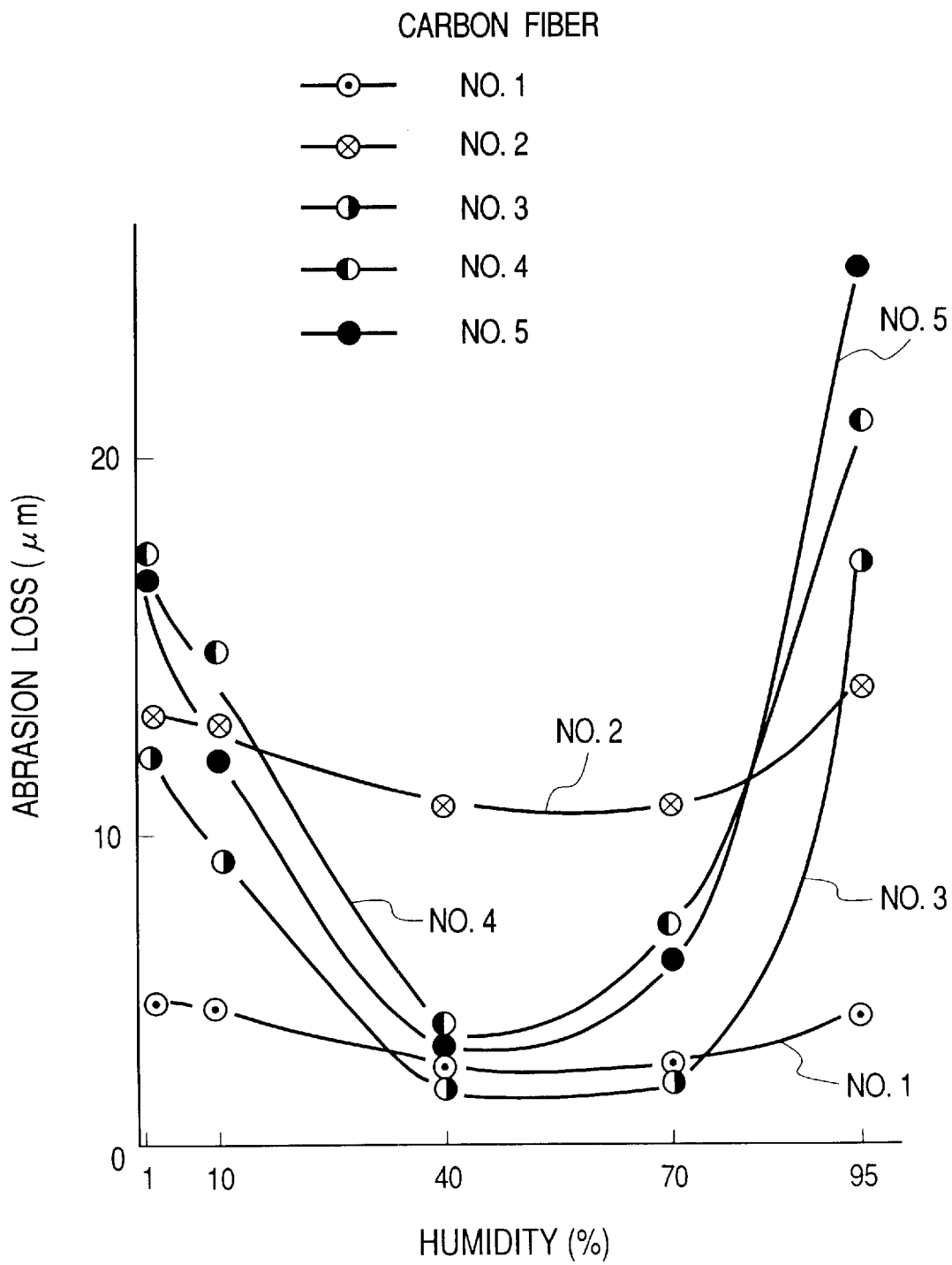
FIG. 9 is a graph showing the relation between the abrasion loss and humidity of a frictional material consisting of fluororesin containing carbon fiber according to a sixth embodiment of; the present invention.

FIG. 9 shows the abrasion loss of the friction member 105 formed of PTFE material containing the carbon fiber of Table 1 after 100 hours of driving when the humidity was changed to 1% to 95% at a temperature of 40° C. The abrasion loss is a value obtained by measuring the height of the level difference 105a of FIG. 8 by a height gauge, and subtracting the height after driving in advance from the height of the level difference 105a before driving.

As can be seen from FIG. 9, the friction members of Nos. 1 and 2, as compared with the friction members of Nos. 3 to 5, are very small in the change (increase) in abrasion at both low humidity and high humidity, as compared with humidity of 40 to 70%.

Also, No. 2, as compared with No. 1, is generally great in abrasion loss. No. 2 is graphitic and relatively soft and its abrasion loss seems to have become relatively great.

[Seventh Embodiment]

Figure 10:
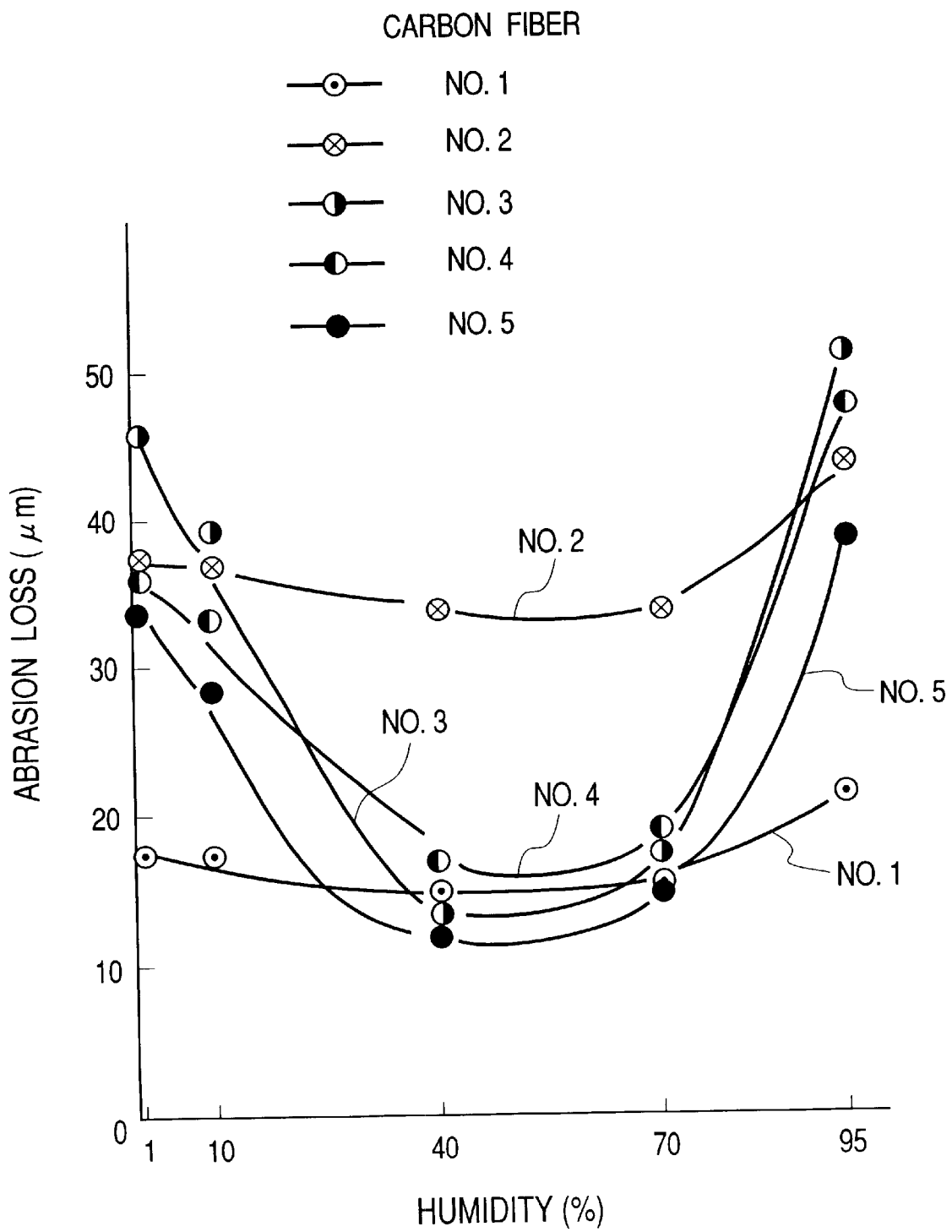
FIG. 10 is a graph showing the relation between the abrasion loss and humidity of a frictional material consisting of polyimide resin containing carbon fiber according to a seventh embodiment of the present invention.

As in Embodiment 6, by the use of the carbon fibers of Nos. 1 to 5 shown in Table 1, the resin material was made into polyimide resin, and as in Embodiment 6, 88% by weight of polyimide resin powder and 12% by weight of carbon material were uniformly dispersed and mixed together and a cylindrical baked member obtained by pressing and heating the mixture at 350° C. for 10 minutes while molding it into a cylindrical shape having a diameter of 8 cm, an inner diameter of 1 cm and a height of 10 cm with molding pressure of 2000 kgf/cm$^2$ was cut to thereby make a sheet having a thickness of 0.5 mm. The sheet was punched, and was used as the ring-like friction member 105 of FIG. 8 in a vibration wave motor, and evaluation similar to that in Embodiment 6 was done. The result is shown in FIG. 10. In FIG. 10, Nos. 1 and 2 show the embodiments, and Nos. 3, 4 and 5 show comparative examples.

As shown in FIG. 10, the abrasion loss of the friction member is generally greater than in the aforedescribed Embodiment 6, and this shows that polyimide resin is affected by humidity, and at low humidity and high humidity, as compared with humidity of 40% to 70%, the tendency of abrasion loss becoming greater as in Embodiment 6 is seen. It seems that the change in the abrasion loss due to the influence of humidity is basically attributable to the difference between the kinds of carbon fiber. However, as the phenomenon of frictional abrasion, the difference between the resin materials appears in Embodiments 6 and 7, and for example, the coefficient of friction of polyimide resin is about 0.4 and is greater than 0.2 which is the coefficient of friction of fluororesin and therefore, correspondingly, the torque of the motor becomes greater and the performance of the motor becomes better, but the fluctuation of the coefficient of friction of polyimide resin becomes as great as about ±0.1, and as compared with about ±0.03 of fluororesin, the fluctuations of the torque and rotation of the motor are correspondingly increased.

Also, as a small quantity of additive material, it is possible to add a solid lubricant such as molybdenum disulfide, a high molecular material such as polyimide power or an inorganic material such as alumina to the resin of Embodiments 6 and 7 to thereby give durability, the stability of frictional abrasion and other various characteristics. Above all, the material having molybdenum disulfide or polyimide powder added thereto exhibited lower abrasion loss than No. 1 of FIG. 9 and No. 1 of FIG. 10.

In both of Embodiments 6 and 7, the friction member 106a which is the partner member of the resin material is a hard film, and it is judged that little or no abrasion occurs thereto and the evaluation is not affected thereby. The use of other hard material, e.g. ceramics, also led to a similar result.

The friction member of the present invention can be used as one of the friction member 105 and the friction member 106a, and in Embodiments 6 and 7, the friction member 105 and the friction member 106a may be interchanged with each other, and the friction member of the present invention may be used as the friction member 106a of the contacting member 106, and a hard film or the like may be used as the friction member 105 of the metallic elastic member 103. Also, the friction of the present invention may be used as each of the friction member 105 and the friction member 106a.

In the above-described embodiments, there has been shown an example in which the friction member is applied to the disc-like vibration wave motor shown in FIG. 8, but besides it, a frictional contacting surface provided with the above-described friction member may be formed on a bar-like vibration. wave motor by a similar method.

Figure 11:
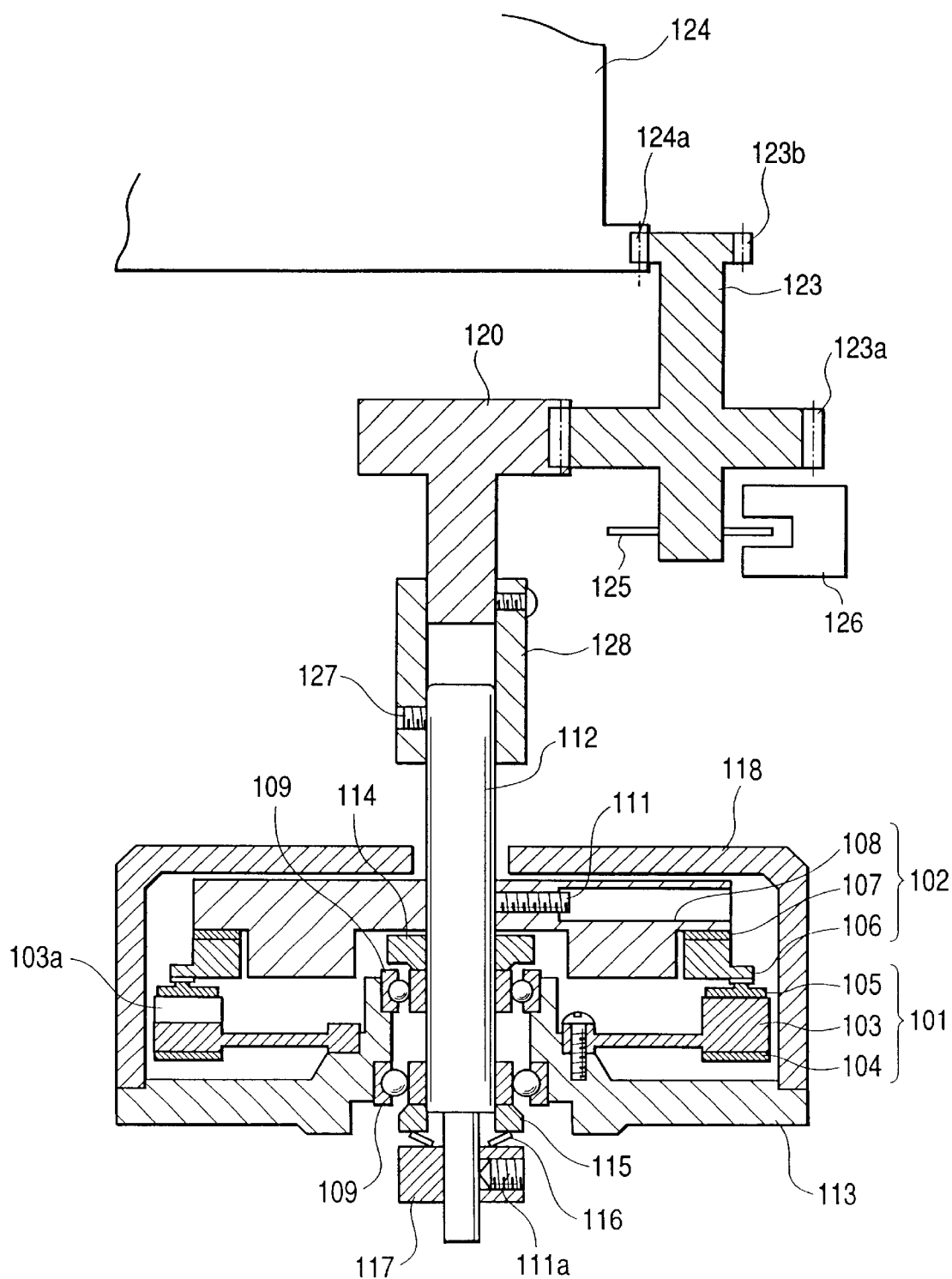
FIG. 11 is a schematic view of an instrument having the vibration wave motor shown in FIG. 8 as a drive source.

FIG. 11 is a schematic view of an apparatus having the vibration wave motor shown in FIG. 8 as a drive source. The reference numeral 123 designates a gear having a large gear 123a and a small gear 123b, and the large gear 123a is in meshing engagement with a gear 120 on the vibration wave motor side. The reference numeral 124 denotes a driven member, for example, a lens barrel, and the small gear 123b of the gear 123 is in meshing engagement with a gear 124a provided on the outer peripheral portion of the lens barrel, and is rotated by the driving force of the motor. On the other hand, an encoder slit plate 125 is mounted on the gear 123, and the rotation of the gear 123 is detected by a photocoupler 126, and the rotation and stoppage of the motor are controlled, for example, for auto-focusing.

As described above, according to the sixth and seventh embodiments, mesophased pitch carbon fiber is used as the carbon fiber contained in the resin which is the friction member, whereby the long-term use of the vibration wave motor under an environment of low humidity or high humidity becomes possible and in addition, the stabilization of the life of the vibration wave motor under an environment having a humidity change also becomes possible, and the reliability of the vibration wave motor is more enhanced.

Also, there can be provided an apparatus using a vibration wave motor excellent in the friction characteristic to the above-mentioned humidity change.

What is claimed is:

1. A method of manufacturing a vibration type driving apparatus comprising:

providing an elastic member;

providing a moving member;

providing a friction member on at least one of said elastic member and said moving member;

pressing said friction member between a mold and said at least one of said elastic member and said moving member forming a smooth contacting surface on said friction member, setting said friction member so that a ridgeline portion of a contacting portion of a partner side contacting said friction member is in non-contact with said friction member, a protruding portion of said friction member being in non-contact with said ridgeline portion of the contacting portion of said partner side.

2. The method of manufacturing a vibration type driving apparatus according to claim 1, further comprising:

forming said friction member with a depressed portion, which is in non-contact with said ridgeline portion of the contacting portion of said partner side.

3. The method of manufacturing a vibration type driving apparatus according to claim 2, further comprising:

forming said depressed portion of said friction member during said pressing.

4. The method of manufacturing a vibration type driving apparatus according to claim 1, further comprising:

forming said protruding portion of said friction member during said pressing.

* * * * *

UNITED STATES PATENT AND TRADEMARK OFFICE
CERTIFICATE OF CORRECTION

PATENT NO. : 6,463,642 B1  
DATED : October 15, 2002  
INVENTOR(S) : Yutaka Maruyama et al.

It is certified that error appears in the above-identified patent and that said Letters Patent is hereby corrected as shown below:

Column 2,  
Line 2, "binder-resin," should read -- binder resin, --  
Lines 17-18, "influence:" should read -- influence --

Column 3,  
Line 10, "embodiment of;" should read -- embodiment of --  
Line 38, "member 1." should read -- member 1 --

Column 7,  
Line 35, "surface.21" should read -- surface 21 --

Column 8,  
Line 16, "prior-art:" should read -- prior-art --

Column 9,  
Line 8, "by, polymerizing" should read -- by polymerizing --

Column 13,  
Line 31, "vibration. wave" should read -- vibration wave --

Signed and Sealed this

Eighth Day of April, 2003

JAMES E. ROGAN  
*Director of the United States Patent and Trademark Office*